(12) United States Patent
Galstian et al.

(10) Patent No.: US 7,667,818 B2
(45) Date of Patent: Feb. 23, 2010

(54) ELECTRICALLY VARIABLE FOCUS POLYMER-STABILIZED LIQUID CRYSTAL LENS HAVING NON-HOMOGENOUS POLYMERIZATION OF A NEMATIC LIQUID CRYSTAL/MONOMER MIXTURE

(75) Inventors: Tigran Galstian, Ste-Foy (CA); Vladimir Presniakov, Quebec (CA); Karen Asatryan, Ste-Foy (CA); Amir Tork, Ste-Foy (CA)

(73) Assignee: Universite Laval, Montreal, Quebec (CA)

( * ) Notice: Subject to any disclaimer, the term of this patent is extended or adjusted under 35 U.S.C. 154(b) by 210 days.

(21) Appl. No.: 11/535,089

(22) Filed: Sep. 26, 2006

(65) Prior Publication Data

US 2007/0052915 A1    Mar. 8, 2007

Related U.S. Application Data

(63) Continuation of application No. 10/861,480, filed on Jun. 7, 2004, now Pat. No. 7,218,375.

(60) Provisional application No. 60/475,900, filed on Jun. 5, 2003.

(51) Int. Cl.
*G02F 1/13* (2006.01)
*G02F 1/1333* (2006.01)
*C09K 19/02* (2006.01)

(52) U.S. Cl. .......................... 349/200; 349/86; 349/88; 349/183

(58) Field of Classification Search ................ 349/200, 349/86, 88, 183
See application file for complete search history.

(56) References Cited

U.S. PATENT DOCUMENTS

| | | | |
|---|---|---|---|
| 5,498,450 A | 3/1996 | Akashi et al. | |
| 5,674,576 A * | 10/1997 | Gotoh et al. | 428/1.2 |
| 5,886,760 A | 3/1999 | Ueda et al. | |
| 5,942,157 A * | 8/1999 | Sutherland et al. | 252/582 |
| 6,437,925 B1 * | 8/2002 | Nishioka | 359/726 |
| 6,545,739 B1 * | 4/2003 | Matsumoto et al. | 349/198 |
| 6,815,016 B2 * | 11/2004 | Kyu et al. | 428/1.1 |
| 6,864,931 B1 * | 3/2005 | Kumar et al. | 349/88 |
| 6,864,951 B1 * | 3/2005 | Ren et al. | 349/200 |

* cited by examiner

*Primary Examiner*—Michael H Caley
*Assistant Examiner*—Charles Chang
(74) *Attorney, Agent, or Firm*—Anglehart et al.

(57) ABSTRACT

A variable focus liquid crystal lens includes a nematic liquid crystal/monomer mixture having a spatially inhomogenous polymer network structure, and an electrode for applying a substantially uniform voltage to the nematic liquid crystal/monomer mixture. The lens is created within a cell by applying a substantially uniform electric field to the nematic liquid crystal/monomer mixture within the cell, while simultaneously irradiating the nematic liquid crystal/monomer mixture using a laser beam having a shaped intensity distribution, so as to induce formation of a spatially inhomogenous polymer network structure within the cell.

14 Claims, 5 Drawing Sheets

ELECTRICALLY VARIABLE FOCUS POLYMER-STABILIZED LIQUID CRYSTAL LENS HAVING NON-HOMOGENOUS POLYMERIZATION OF A NEMATIC LIQUID CRYSTAL/MONOMER MIXTURE

CROSS-REFERENCE TO RELATED APPLICATIONS

This application is a continuation application of U.S. patent application Ser. No. 10/861,480 filed Jun. 7, 2004, which claims benefit under 35 USC § 120 of U.S. patent application No. 60/475,900 filed Jun. 5, 2003.

MICROFICHE APPENDIX

Not Applicable.

TECHNICAL FIELD

The present invention relates generally to electro-optical devices, and in particular to an electrically variable focus polymer-stabilized liquid crystal lens.

BACKGROUND OF THE INVENTION

Different ways of designing variable focal length lenses based on flat layers of nematic liquid crystals (NLC) are known in the art. Typically, a non-homogeneous electric field is used to induce a suitable configuration of the NLC director (that is, the direction of the preferred molecular orientation) in a cell so as to create a lens-like distribution of the refractive index. Non-homogeneous electric fields can be generated by means of suitable electrode structures provided on one or both cell substrates.

In some cases, a small amount (e.g. up to 3%) of a reactive monomer is added to the NLC. The reactive monomer is substantially uniformly polymerized in situ by uniform UV irradiation during application of the non-homogenous electric field. Polymerization of the monomer in this manner leads to the formation of a spatially uniform polymer network structure or matrix, which reduces the ease with which the NLC director can be reoriented. Accordingly, polymerization of the monomer while the NLC while under the influence of the non-uniform electric field reduces the tendency of the NLC director to re-orient back to its relaxed state when the electric field is removed, thereby producing a "permanent" lens within the NLC. The accuracy of control of the focal length of such a lens depends on the concentration of monomer. Another known method of forming micro-lenses, of fixed focal length, is to use strongly focused light to induce LC reorientation and simultaneous UV photopolymerization.

Different polymer network structures and their influence on the electrical switching properties of NLC have been studied. In particular, for the structure of nematic domains separated by thin polymeric walls, it has been established that the threshold field of nematic reorientation increases as the density of the polymer network increases. Recently, patterned irradiation has been used to produce regions with different threshold voltage for switching. When used in conjunction with a mask in the form of concentric dark and transparent rings, this technique can be used to produce a switchable Fresnel lens.

SUMMARY OF THE INVENTION

An object of the present invention is to provide a electrically variable focus polymer-stabilized liquid crystal lens, and methods for making same.

Accordingly, an aspect provides a variable focus liquid crystal lens comprising: a cell containing a nematic liquid crystal/monomer mixture having a spatially non-homogenous polymer network structure distributed non-uniformly within the nematic liquid crystal monomer mixture; and at least one electrode for applying a substantially uniform voltage to the nematic liquid crystal/monomer mixture in the cell.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
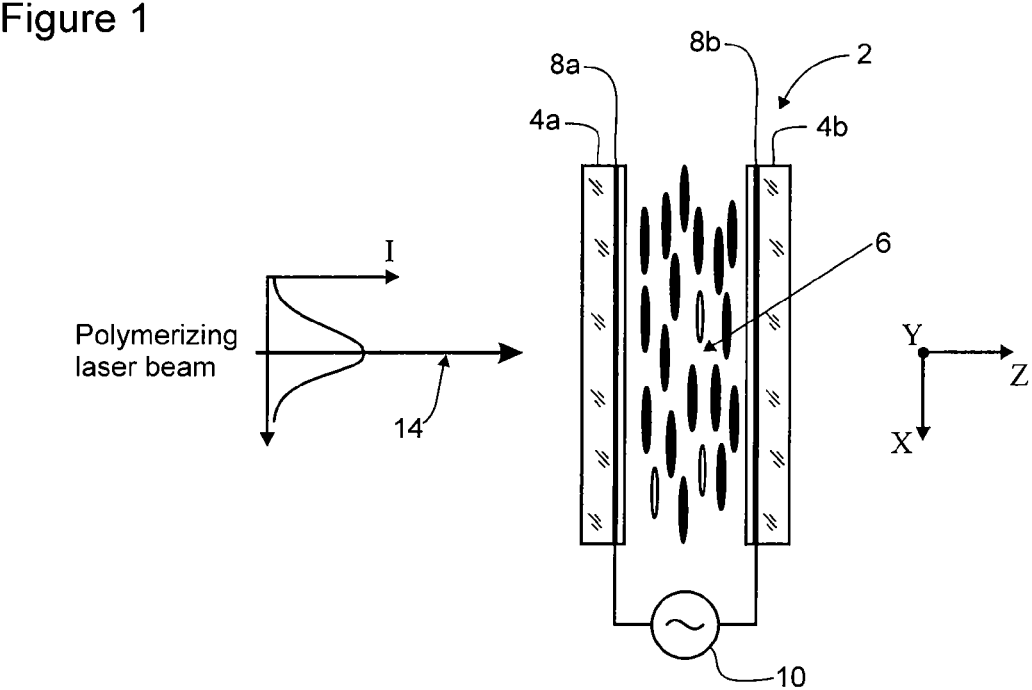
FIG. 1 is a cross-sectional view schematically illustrating a cell usable for generating a lens in accordance with an embodiment of the present invention.
Figure 2:
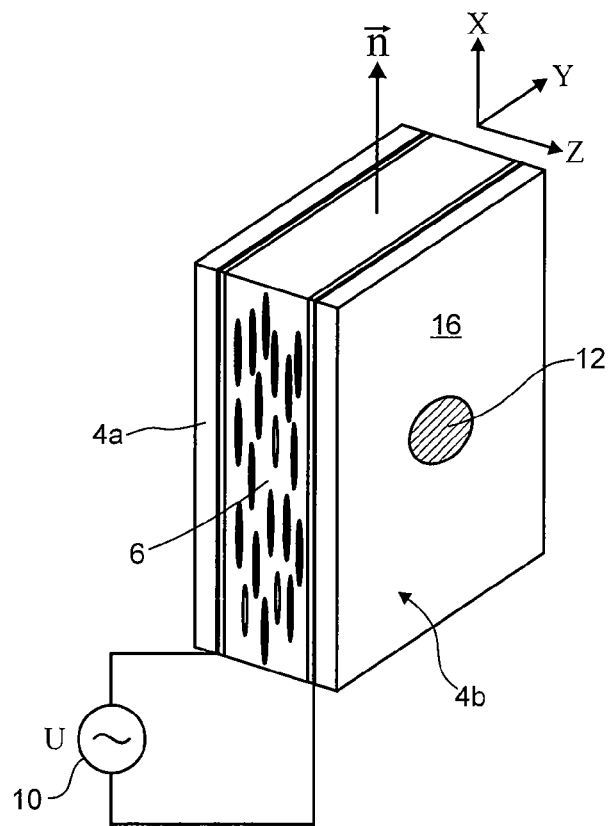
FIG. 2 is a perspective view of the cell of FIG. 1.

The present invention provides an electrically variable focal length lens, and methods of making same. FIGS. 1 and 2 illustrate the structure of a lens in accordance with the present invention. An experimental demonstration of a process of making the lens, and properties of a lens produced by this method are then described with reference to FIGS. 3-7.

Stated very broadly, a variable focal length lens in accordance with the present invention is generated by inducing the formation of a spatially non-homogenous polymer network within an NLC/monomer mixture contained within a cell, in the presence of a uniform electric field.

As shown in FIGS. 1 and 2, the cell 2 can conveniently be defined by a pair of substantially parallel transparent substrates 4 separated by a gap that is filled with the NLC/monomer mixture 6. Each substrate 4 (which may, for example, be made of glass)includes a transparent electrode 8 (e.g. of Tin Oxide; Indium Tin Oxide (ITO) etc.) coated with a surfactant (e.g. rubbed PMMA) to define a uniform rest-state orientation of the NLC director. The electrodes 8 are connected to a voltage source 10, which enables the generation of a substantially uniform electric field through the NLC/monomer mixture 6 within the cell 2. The gap between the substrates 4 may have any suitable thickness (e.g. about 4 µm).

In preferred embodiments, the spatially non-homogenous polymer network 12 (FIG. 2) is centro-symmetric, which can be formed by irradiation with a laser beam 14 having a Gaussian energy distribution across the beam, as may be seen in FIG. 1.

A uniform electric field is used during formation of the polymer network 12 in order to define a substantially uniform orientation of the NLC during this process. In some embodiments, the uniform electric field is of zero strength, in which case the uniform orientation of the NLC during polymerization corresponds with the rest-state orientation of the NLC director defined by the surfactant. Alternatively, a uniform non-zero electric field may be used to define a desired NLC director orientation during polymerization.

The NLC/monomer mixture 6 may be composed of any suitable nematic liquid crystal and a small amount (e.g. about 3% by weight) of photopolymerizable monomer. The NLC may be a commercially available NLC, such as E7 (by Merk). The photopolymerizable monomer may be a monofunctional monomer (such as glycidyl methacrylate) which contains an epoxy group (e.g. SR-379, from Sartomer Company)

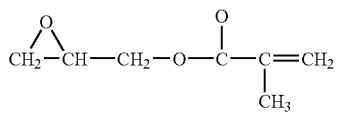

and a photoinitiation complex (i.e. dye, initiator and coinitator) known in the art.

The laser beam 14 can be generated by any suitable laser source (not shown in FIGS. 1 and 2), and has a frequency selected to correspond to the range of sensitivity of the monomer. For example, a Verdi laser beam ($\lambda$=532 µm) having a desired diameter (e.g. about 2.5 mm) can be used in conjunction with the above-noted NLC/monomer mixture 6. Suitable optical elements (lenses, mirrors etc) can be used in a manner known in the art to collimate the laser beam 14 at the desired diameter, define a Gaussian energy distribution across the beam, and direct the beam substantially normally through the cell 2.

With this arrangement, irradiation of the NLC/monomer mixture 6 by the laser beam 14 causes the monomer lying within the irradiated region to polymerize, thereby forming a 3-dimensional polymer network structure 12 (FIG. 2) within the irradiated region. The density of the network structure is proportional to the duration of the irradiation, and the optical power. Consequently, these parameters can be selected to induce a non-homogenous polymerization density, which follows the centro-symmetric Gausian energy distribution of the laser beam 14.

As is known in the art, polymerization of the monomer increases the threshold electric field required to induce re-orientation of NCL, and the magnitude of the threshold increase is proportional to the density of the polymer network. Thus, non-homogenous polymerization of the monomer causes the NLC within the irradiated/polymerized region to exhibit a corresponding non-homogeneous electro-optical response to a uniform electric field.

More particularly the threshold field strength (voltage) for director reorientation will be maximal in the center of the polymerized region 12, and minimal in the surrounding non-illuminated region 16. As a result, the application of a uniform electric field to the cell 2 produces a corresponding distribution of the nematic director, to form a circularly symmetric distribution of the refractive index $\vec{n}$, with a maximum in the center of the polymerized region 12. Such a cell 2 will represent a LC lens. Changes in the applied voltage will vary the profile of the refractive index, and the focal length of the lens. An experimental demonstration of the process, and properties of the resulting lens will now be described with reference to FIGS. 3-7.

Figure 3:
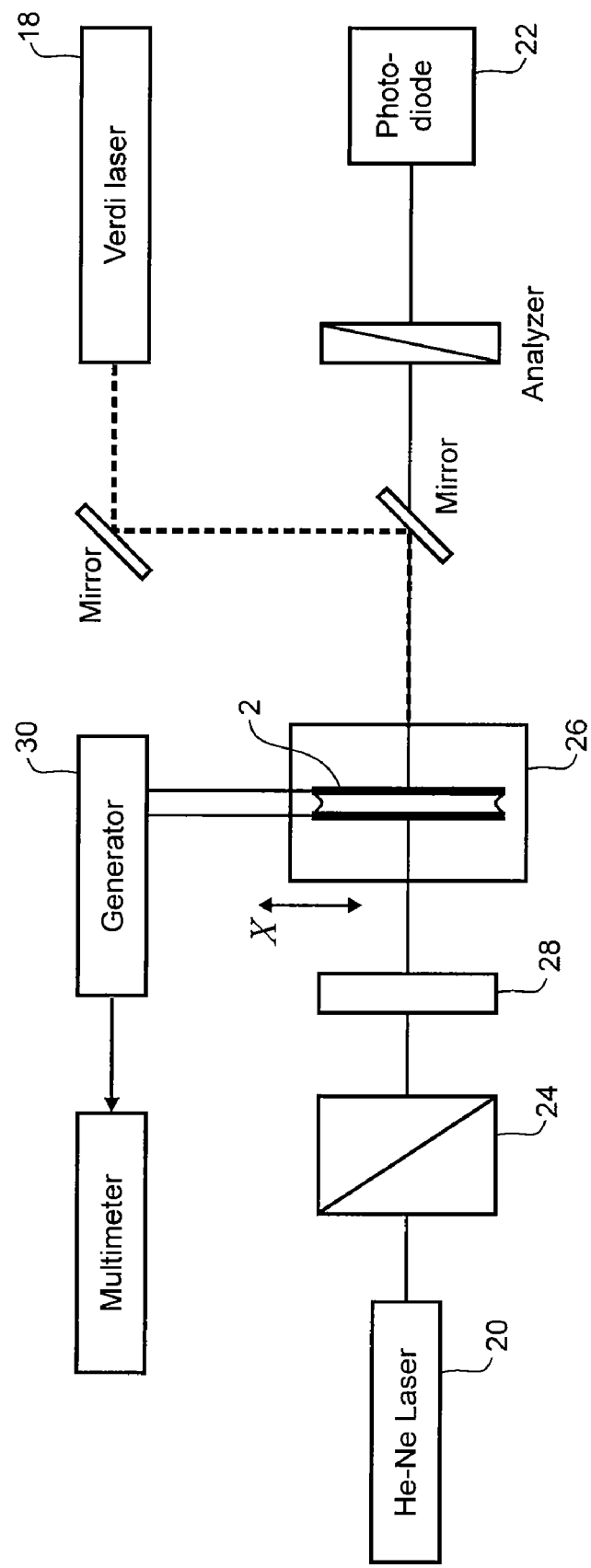
FIG. 3 is a block diagram schematically illustrating principal element of an experimental apparatus for generating and analyzing a lens in accordance with the present invention.

FIG. 3 schematically illustrates an experimental apparatus used to generate and examine a variable focal length lens in accordance with the present invention. As shown in FIG. 3, the apparatus includes an LC cell 2 as described above with reference to FIGS. 1 and 2; a Verdi laser 18 for polymerizing the monomer to generate the lens within the cell 2, as described above. A He—Ne laser 20 generates a narrow-beam probe that is detected by a photodiode 22 for analyzing properties of the lens.

Photopolymerization of the monomer was induced by means of the Verdi laser beam ($\lambda$=532 µm) having Gaussian intensity distribution as described above. In this particular trial, the diameter of the beam was 2.3 mm. The cell was irradiated for 30 minutes at a total power of 23.8 mW. No electric field was applied to the NLC during irradiation.

The He—Ne laser beam ($\lambda$=543.5 µm, diameter 0.7 mm) was used as a probe at normal incidence on the cell 2. In order to analyze the properties of the lens, the intensity (I) of He—Ne light transmitted through the cell 2 is analyzed as a function of position (X) across the irradiated (polymerized) region 12. The rubbing direction of the PMMA surfactant in the cell 2 corresponded to axis X and was oriented at 45° with respect to crossed Glan prism 24 (used as a polarizer) and an analyzer. The intensity ($I_{max}$) of light transmitted through the parallel polarizers was measured also to take into account the absorption and reflection losses on polarizers. The cell 2 was mounted on a movable stage 26, allowing examination of different points of the cell 2 in the X direction. The intensity of the probe beam was attenuated by means of a neutral filter 28 to minimize its influence on the NLC/monomer mixture within the cell. The light transmitted through the cell 2 was detected by the photodiode 22. The electric field within the cell was generated by a signal generator 30 connected to apply a sinusoidal signal with 1 kHz frequency to the electrodes 4. The r.m.s. value of the applied voltage was monitored using a numerical multimeter.

Figure 4:
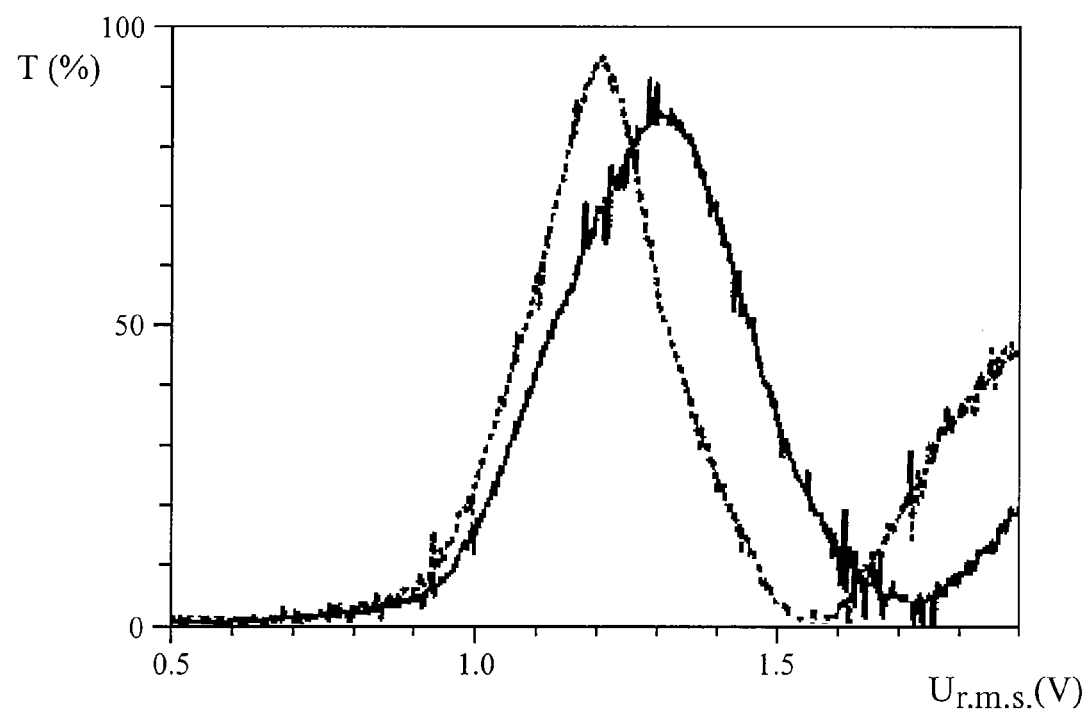
FIG. 4 is a graph showing representative variations in light transmittance through two points of the cell of FIG. 1 with changing applied voltage.

As may be seen in FIG. 4, the dependences of the normalized light transmission $T=I/I_{max}$ on the applied voltage measured at the central point of polymerized region 12 (solid line) and at the non-polymerized region 16 (dashed line) are equivalent qualitatively, but are shifted with respect each other along the voltage axis. This fact indicates the similar character of the field-induced nematic reorientation at these points. However the reorientation at the polymerized point requires higher voltage, than the same reorientation at the non-polymerized one. It should be note that an oscillated behavior of dependence of T on the external field is also typical for the case of a pure planar nematic layer.

Figure 5A:
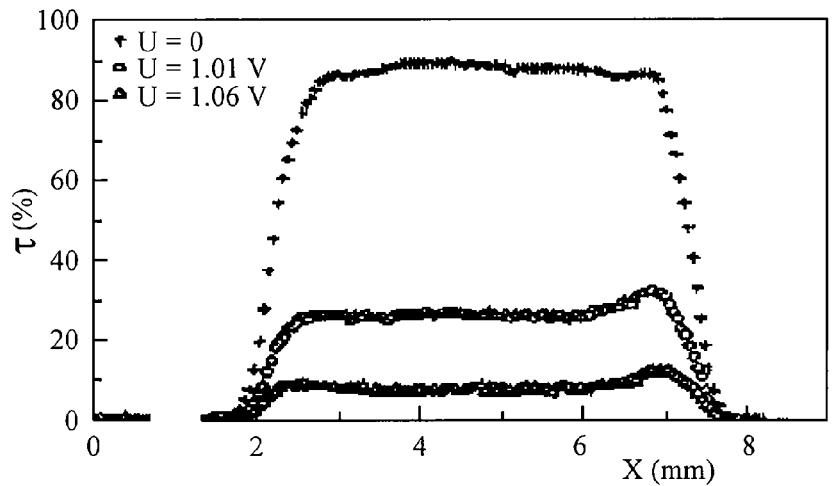
FIGS. 5a-5c are graphs showing representative variations in light transmittance across the cell of FIG. 1, and different applied voltages.

As shown in FIG. 5a, the light transmission before polymerization as a function of the probe beam position X in the cell 2 is shown for different values of applied voltages. The interval of X from 2 mm to 7.5 mm corresponds to the region of the cell, which is filled with the NLC/monomer mixture. Within this portion of the cell T≠0 due to the birefringence of the NLC. Outside of this region the empty cell is optically isotropic and the T=0. As can be seen from FIG. 5a, T is generally constant everywhere in the filled region at U=0. This optical homogeneity indicates that the orientation of the NLC in the cell is uniform. Under the influence of the electric field the light transmission varies. The curves represented in FIG. 5a for U=1.01 V and 1.06 V show that T is constant in the filled area, except the small regions near the borders (at $\lambda$=2.3 and 7 mm), where the edge effects become apparent.

Figure 5B:
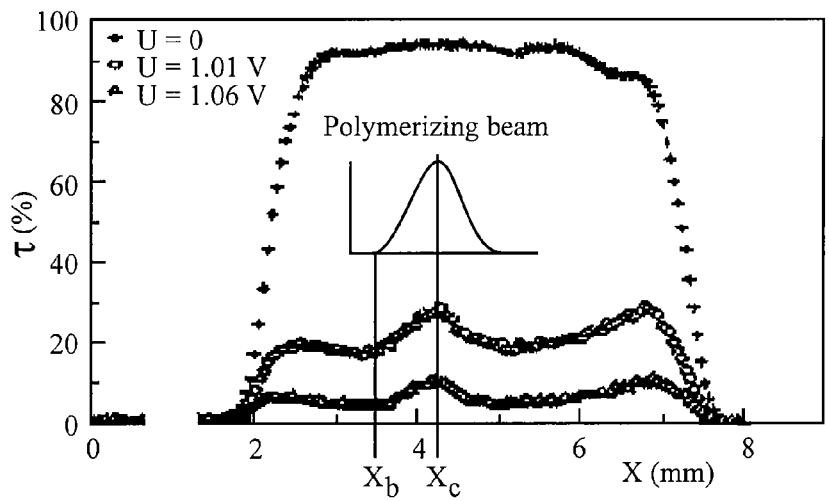
Figure 5C:
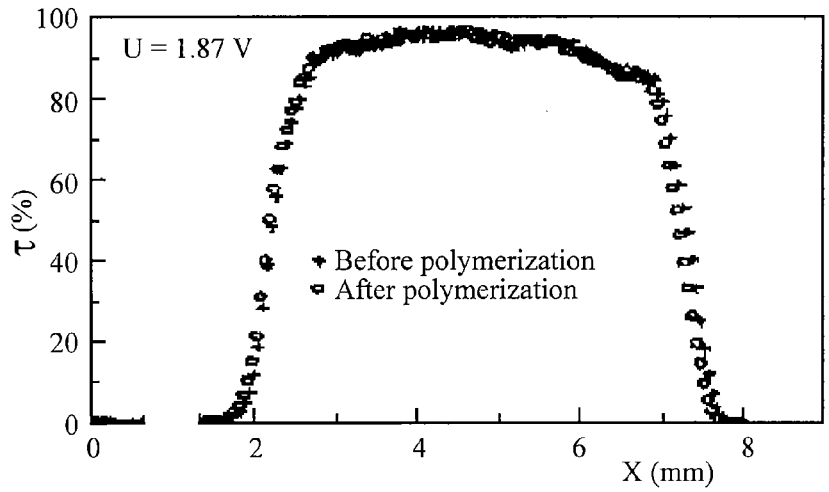

FIG. 5b shows the same variation in light transmission with applied voltage, but measured after the process of photopolymerization. As may be seen in FIG. 5b, the optical homogeneity of the cell is more or less preserved for U=0. However an applied voltage produces non-homogeneous changes of the light transmission. Thus at U>0 the light transmission curves have clearly expressed peaks with a maximum corresponding to the center of the polymerizing beam 14. It should be noted that the voltage values 1.01V and 1.06V in FIG. 5b do not correspond to the situation presented in FIG. 4, because the measurements were made for two different cells having different thickness. In the inset of FIG. 5b the Gaussian intensity distribution of the polymerizing beam 14 is shown. The center of the beam coincides with the position $X_c$, and the form of the light transmission peaks approximately reproduces the Gaussian energy profile of the polymerizing beam 14. The peak amplitude decreases with increasing applied voltage, and disappears completely for high voltage values. In FIG. 5*c* the results for the light transmission before and after photopolymerization at high voltage are presented. The curves coincide at every point of the cell that indicates an uniformization of the cell (homeotropic alignment of NLC).

The centro-symmetric character of the electro-optical response of the cell shown in FIG. 5*b* indicates a similar distribution of the effective refractive index in the polymerized area 12. Such distribution is due to the centro-symmetric character of nematic reorientation, which depends strongly on the structure of the polymer network induced by the polymerizing laser beam 14. Since the polymerization rate is proportional to the intensity of light, polymerization appears to start from the center of the irradiated spot, and propagate in the plane of the substrates 4, with circular symmetry. As a consequence, and due to the diffusion of monomer to the brighter regions, the density of the polymer network is maximal in the center of irradiated spot and decreases toward the outer regions. Higher voltage is necessary to reorient the nematic confined in polymer network with higher concentration. Thus the retardation of the nematic reorientation is observed in the center of polymerized area 12 with respect to the edges. At much higher values of applied voltage, the influence of the polymer network become negligible compared to the electric field, and the nematic reorients uniformly substantially throughout the cell (see FIG. 5*c*).

Figure 6:
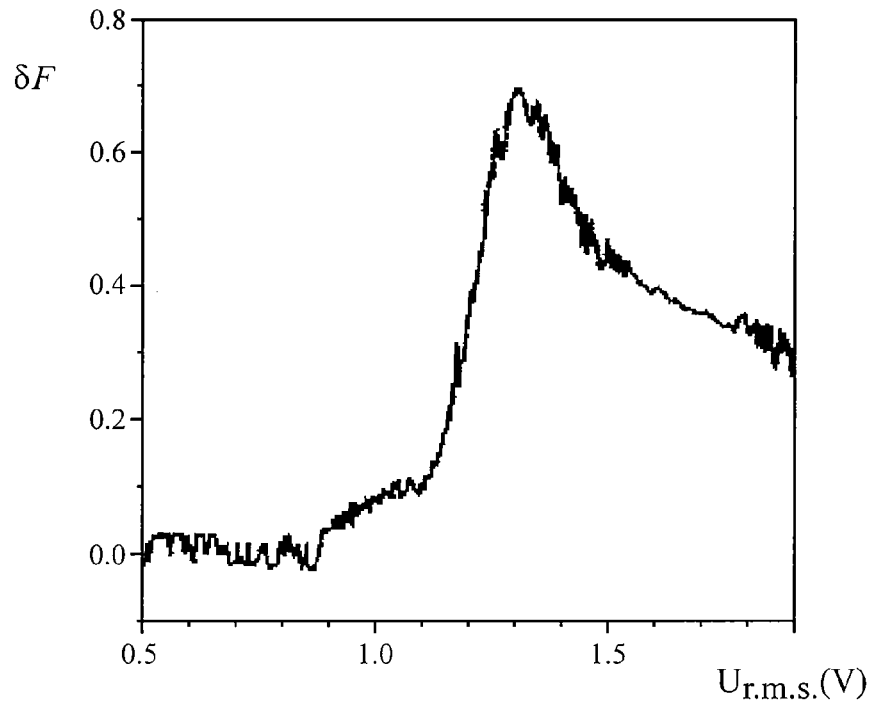
FIG. 6 is a graph showing representative variations in phase difference with changing applied voltage.

FIG. 6 shows the dependence of the phase difference $\delta F = \phi(X_c) - \phi(X_b)$ on the applied voltage in which, $\phi$ being the induced phase difference of ordinary and extraordinary waves at the given point; $X_c$ and $X_b$ are the coordinates of the center and the border of the photopolymerized spot, respectively (see FIG. 5*b*). $\phi$ has been calculated from the relation:

$$I = I_{max} \sin^2\left(\frac{\varphi}{2}\right)$$

The maximum difference $\delta F$ is achieved at the voltages lightly above the threshold value. This difference decreases with increasing voltage and eventually becomes zero for high voltages.

Figure 7:
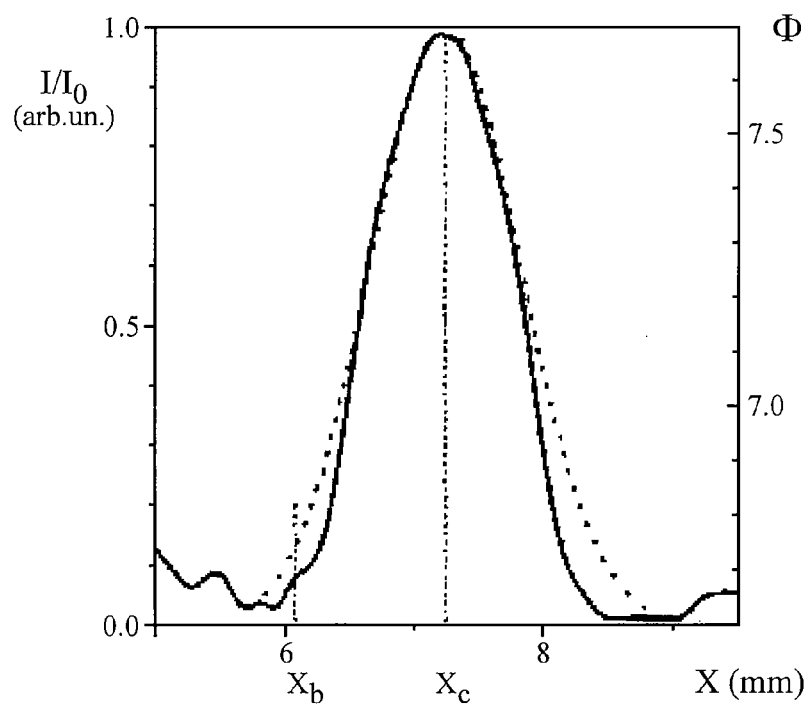
FIG. 7 is a graph showing representative variations in lens focal length with changing applied voltage.

As shown in FIG. 7, the effective focal length varies inversely with $\delta F$ in the range of voltages immediately above the threshold voltage $U_{th}$ (=0.98 V in FIG. 7). Within this range, the focal length may be calculated using the expression $$f = \frac{\pi a^2}{\lambda \delta F},$$

where $a = X_c - X_b$ is the radius of the lens.

The embodiment(s) of the invention described above is(are) intended to be exemplary only. The scope of the invention is therefore intended to be limited solely by the scope of the appended claims.

We claim:

1. A variable focus liquid crystal lens comprising:
   a cell containing a liquid crystal/monomer mixture having a spatially non-homogenous polymer network structure distributed within the liquid crystal/monomer mixture, the polymer network having a predetermined spatial density variance that creates a corresponding spatial variance in the electro-optical response of the liquid crystal; and
   at least one electrode for applying a substantially uniform voltage to the liquid crystal/monomer mixture in the cell.

2. The variable focus liquid crystal lens of claim 1, wherein the spatially non-homogenous polymer network structure is circularly symmetrical.

3. The variable focus liquid crystal lens of claim 1, wherein the liquid crystal/monomer contains less than 3% polymer chains.

4. The variable focus liquid crystal lens of claim 1, wherein the liquid crystal/monomer mixture contains approximately 97% liquid crystal.

5. The variable focus liquid crystal lens of claim 1, wherein the non-homogeneous polymer network is formed by photopolymerization.

6. The variable focus liquid crystal lens of claim 5, wherein photopolymerization comprises irradiating the liquid crystal/monomer mixture using a light beam having a shaped intensity distribution.

7. The variable focus liquid crystal lens of claim 1, wherein the monomer contained in the liquid crystal/monomer mixture is a glycidyl methacrylate.

8. A variable focus liquid crystal lens comprising:
   a cell filled with a liquid crystal containing a polymer network structure distributed within the liquid crystal/monomer mixture, the polymer network having a predetermined spatial density variance that creates a corresponding spatial variance in the electro-optical response of the liquid crystal; and
   a variable alternating field source coupled to said cell for applying an alternating electric field of spatially uniform magnitude to the liquid crystal mixture in the cell.

9. The variable focus liquid crystal lens of claim 8, wherein the polymer network structure is circularly symmetrical.

10. The variable focus liquid crystal lens of claim 8, wherein the cell is filled with a liquid crystal/monomer mixture containing less than 3% polymer chains.

11. The variable focus liquid crystal lens of claim 8, wherein the cell is filled with a liquid crystal/monomer mixture containing approximately 97% liquid crystal.

12. The variable focus liquid crystal lens of claim 8, wherein the polymer network is formed by photopolymerization.

13. The variable focus liquid crystal lens of claim 12, wherein the cell is filled with a liquid crystal/monomer mixture, and photopolymerization comprises irradiating the liquid crystal/monomer mixture using a light beam having a shaped intensity distribution.

14. The variable focus liquid crystal lens of claim 8, wherein the cell is filled with a liquid crystal/monomer mixture, the monomer contained in the liquid crystal/monomer mixture is a glycidyl methacrylate.

* * * * *